W. WESTBURY.
GLASS DRAWING APPARATUS.
APPLICATION FILED JAN. 26, 1916.
1,179,250.
Patented Apr. 11, 1916.
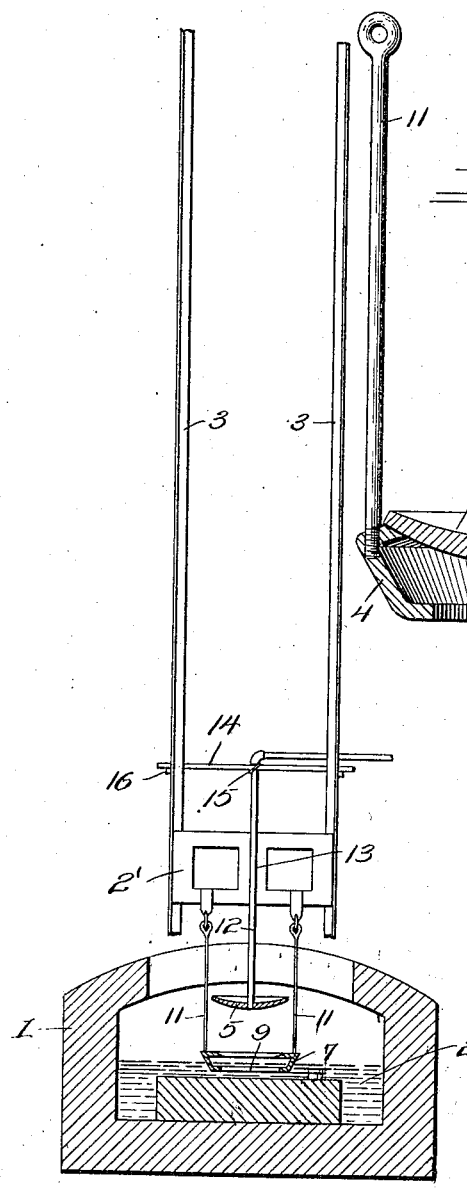
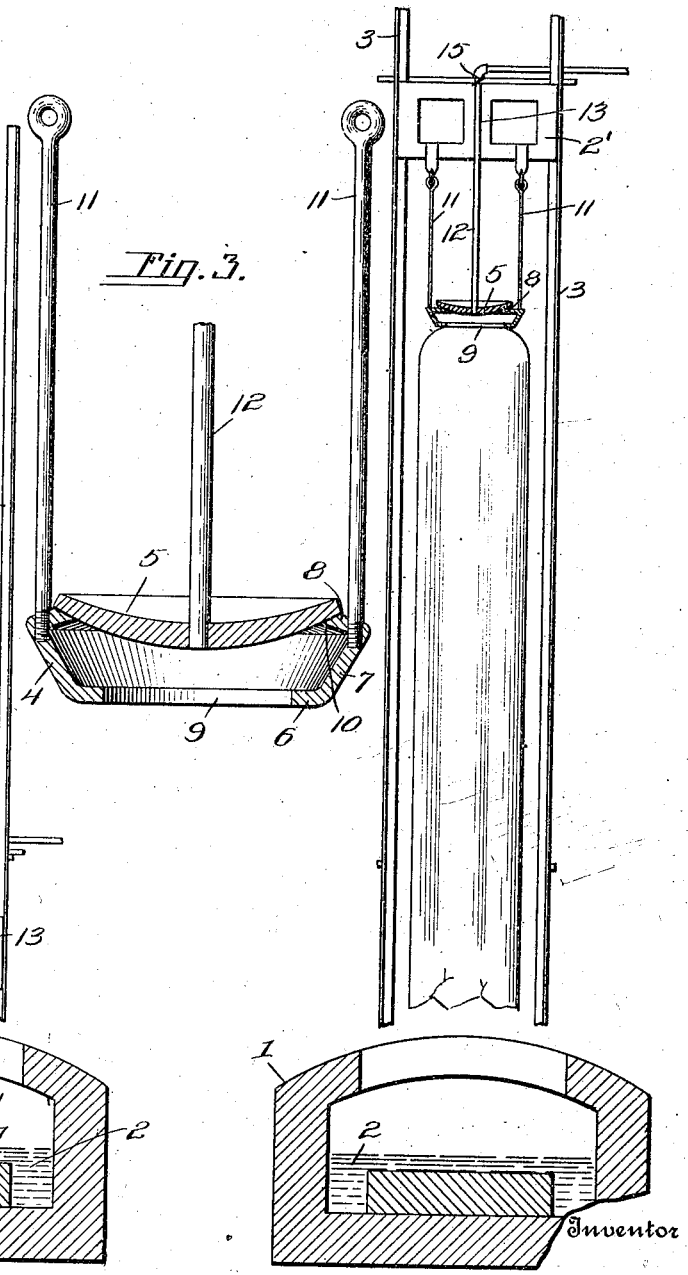

UNITED STATES PATENT OFFICE.

WILLIAM WESTBURY, OF OKMULGEE, OKLAHOMA.

GLASS-DRAWING APPARATUS.

1,179,250.

Specification of Letters Patent.

Patented Apr. 11, 1916.

Application filed January 26, 1916. Serial No. 74,467.

*To all whom it may concern:*

Be it known that I, WILLIAM WESTBURY, a citizen of the United States, residing at Okmulgee, in the county of Okmulgee and State of Oklahoma, have invented new and useful Improvements in Glass-Drawing Apparatus, of which the following is a specification.

My invention relates to improvements in apparatus for drawing glass cylinders for the production of window glass, etc., and particularly to an improved construction of drawing tool whereby the glass is drawn from a source of supply of molten glass to form the cylinder.

In the art of drawing glass cylinders, a good many defective draws are due to the imperfect formation or breaking of the neck or connection between the cylinder and the bait. This is due to variations of temperature between the bait and outside atmosphere and between the inner and outer surfaces of the initial portion of the cylinder, by which the interior and exterior surface tension of the glass at and adjacent to the neck is rendered unequal, whereby breakage of the neck is liable to occur owing to unequal expansion and contraction when the bait is cooled by exposure to the atmosphere and the air supplied to the cylinder in the progress of the draw. Another cause of the formation of an imperfect neck or breakage of the same is often due to the premature admission of air to the interior of the cylinder at the beginning of the drawing operation, whereby the bait is chilled unduly before the cylinder hardens sufficiently for firm adhesion thereto, the resulting contraction of the bait and unequal contraction of the neck causing the separation of these parts or fracture of the neck and an abortive drawing action. In many cases the too sudden turning on of the air blows the walls of the neck of the cylinder out against the side of bait or blow pipe while the pipe is at the highest temperature, and as the bait cools quickly the neck is crushed by contraction.

The primary object of the invention is to provide a drawing tool which is so constructed as to insure a supply of air to the interior of the cylinder for a sufficient time at the beginning of the draw to effect the formation of a perfect neck having substantially equal interior and exterior surface tension and capability of expansion and contraction, whereby any tendency of the neck to separate from the bait or to break as a result of unequal surface tensions and contraction and expansion will be avoided.

A further object of the invention is to provide means whereby the supply of air from the source of compressed air supply to the cylinder will be deferred at the beginning of the draw for a sufficient period to prevent undue cooling and contraction of the bait prior to the formation of the neck, by which the production of a perfect neck or connection between the cylinder and bait will be further insured.

The invention consists of the features of construction, combination and arrangement of parts herein fully described and claimed, reference being had to the accompanying drawing in which:—

Figure 1 is a sectional elevation showing the tool in connection with a source of glass supply, with the parts arranged as at the beginning of the draw. Fig. 2 is a similar view showing the parts as they appear after the cylinder is partially drawn. Fig. 3 is a sectional view through the complete bait as it appears when the hollow bait body is closed at top by the blow head.

Referring to the drawing, 1 designates a doghouse or other receptacle containing a supply of molten glass 2 from which the cylinders are to be formed, and 2' designates a carriage movable vertically upon suitable track rails 3 and which forms a support for the drawing tool. This carriage is adapted to be raised and lowered in any suitable manner or by any of the means commonly employed. I have not considered it necessary to show any raising and lowering means, as the same forms no part of the present invention and as any known type of carriage controlling means may be used.

The bait embodying my invention is formed of two sections and comprises a hollow bait body 4 and a valve or closure member 5. The bait body 4 may be, as shown, in the form of an inverted frusto-conical body consisting of a bottom wall 6 side wall 7 and top wall 8. This body is of hollow formation for the purpose of securing desired cooling effects, and is provided in its bottom and top walls with air inlet openings 9 and 10, the wall of the upper opening 10 being doubled to form a valve seat. The body 4 is arranged below the carriage 2 and supported therefrom by suspending rods or members 11, while the valve or closure member 5 is fixed to the lower end of a vertically movable air supply or blow pipe 12, which in the operation of the drawing apparatus is raised and lowered with the carriage and bait body. The lower end of the pipe 12 is vertically disposed and extends centrally through the valve 5 and is suitably fixed thereto, the said lower and vertically disposed end of the pipe extending slidably through a guide opening 13 suitably formed or provided upon the carriage. The valve 5 is of concavo-convex form and its convex surface is adapted for engagement with the seat wall of the opening 10 to close communication between the atmosphere and the interior of the bait body, while permitting air to flow into and through the bait body from the pipe 12. The sliding engagement between the carriage and blow pipe provides a relatively movable or lost-motion connection between the bait body and the valve or closure member 5, and for the purpose of regulating and controlling the degree of lost-motion a horizontal transverse stop bar 14 is provided and suitably secured to the pipe 12, as shown at 15, and this bar is adapted for engagement with stop members 16 on the guide rails 3 to limit the downward movement of the valve member, as shown in Fig. 1, so as to arrest the downward motion of the valve member at a point above the bait body and before the latter reaches its limit of downward movement in bringing it in contact with the glass 2 in the reservoir 1 in the operation of starting to draw a cylinder.

In the practical operation of the tool, the carriage is lowered in the usual manner until the lower portion of the bait body 4 is submerged in the molten glass 2, at which time the valve member 5 will be supported above and in spaced relation to said bait body, as above described and as shown in Fig. 1. The carriage is then moved upwardly on the drawing operation, the glass adhering to the surface of the bait body to form the neck by which the glass is drawn and connection made between the bait body and the drawn out cylinder. On the upward movement of the carriage and bait body, the latter will pass above the surface of the molten glass and will be exposed to the cooling effects of the air, both internally and externally until it engages the valve member 5, an internal cooling being effected by the ingress of the air through the opening 10 to the interior of the bait body. Hence, as will be readily understood, the interior and exterior surfaces of the bait body will be uniformly subjected to the cooling action of the air during the initial portion of the draw and while the neck is hardening, thus adapting the interior and exterior surfaces of the bait body and neck to contract and expand to like degrees, the surface tension of the sides of the neck being also equalized, whereby thorough hardening of the neck is permitted and cracking or separation of the same from the bait prevented. The hollow bait body has a preliminary upward movement, during which atmospheric air is admitted thereto, until it comes in contact with the valve or closure member 5, by which the opening 10 is closed to shut off communication between the cylinder and the atmosphere and to permit air to pass into the cylinder only through the pipe 12 to expand the cylinder in the usual way. During this preliminary movement the neck is hardening and the operator can not by any means prematurely supply air through the blow tube to the cylinder, thus avoiding any sudden or premature cooling of the interior of the bait and neck of the cylinder and unequal expansion and contraction of the same. Defects in the formation of the neck and its adherence to the bait as a result of the supply of compressed air to the cylinder before the neck has hardened will therefore be obviated. During the remainder of the draw the hollow bait body is sealed by the valve or blow head 5 to confine the air from the blow pipe within the cylinder, the air from the blow pipe being admitted at the desired pressure or pressures by means of a controlling valve or other controlling means in the usual way. After the cylinder has been drawn it is detached from the bait and surface of the glass in the receptacle 1 in any ordinary manner and the bait is relowered for the succeeding operation. In the lowering of the bait the carriage will descend with the blow pipe until the movement of the pipe is arrested by contact of the bar 14 with the stops 16, the bait body descending until immersed in the molten glass in the receptacle 1 while the valve or closure member 5 is stopped short of the full length of travel of the bait to position the parts for a repetition of the operation above described, and as shown in Fig. 1. By thus controlling the cooling of the surfaces of the bait and portion of the glass forming the neck of the cylinder defects of the character described will be prevented, so that a larger percentage of perfect cylinders may be made.

I claim:—

1. In a glass drawing apparatus, a vertically movable bait comprising a body having interior and exterior surfaces adapted to be exposed to the cooling effects of the atmosphere, and means for controlling communication between the interior surface and the atmosphere to subject such interior surface as well to the normal cooling action of the atmosphere during a preliminary portion of the period of the draw.

2. In a glass drawing apparatus, a vertically movable bait comprising a hollow body having upper and lower air passages, means for closing the upper air passage during a predetermined portion of the period of the draw, said means being operative to permit the bait body to move upward a predetermined distance in the drawing action before closing said air passage, and means for supplying air to the hollow bait body during the period of closure of said upper air passage.

3. In a glass drawing apparatus, a vertically movable bait comprising a hollow body having air passages in the top and bottom thereof, a closure for said upper air passage arranged to permit the bait body to move upward a predetermined distance in the drawing action before closing said air passage, and means for supplying a controlled volume of air to the interior of the hollow bait body during the period of closure thereof.

4. In a glass drawing apparatus, a vertically movable hollow bait body having air passages in the top and bottom thereof, a valve for closing the upper air passage, means governing said valve to close said passage except during a predetermined movement of the bait body in the first portion of the draw, and an air supply pipe connected to and movable with said valve.

5. In a glass drawing apparatus, a vertically movable hollow bait body having air passages in the top and bottom thereof, a valve for closing said upper air passage and vertically movable both with and independently of the bait body, and means for arresting the downward movement of the valve to a degree less than the downward movement of the bait body.

6. In a glass drawing apparatus, a vertically movable hollow bait body having air passages in the top and bottom thereof, a vertically movable carriage carrying said bait body, a valve for closing the upper air passage, a blow pipe carrying the valve and slidably connected with the carriage, and means for limiting the downward movement of the valve short of the extent of downward movement of the bait body.

7. In a glass drawing apparatus, a vertically movable hollow bait body having air passages in the top and bottom thereof, a carriage supporting said bait body, a valve for controlling the upper air passage in the bait body and having a lost-motion connection with the carriage, and means for limiting the downward movement of the valve short of the length of downward travel of the bait body.

8. In a glass drawing apparatus, a vertically movable hollow bait body having air passages in the top and bottom thereof, a carriage supporting said bait body, a blow head having a lost-motion connection with the carriage and including a valve member controlling the upper air passage in the bait body, and a stop for arresting the downward movement of the blow head to an extent short of the length of downward travel of the bait body.

In testimony whereof I affix my signature in presence of two witnesses.

WILLIAM WESTBURY.

Witnesses:
A. L. NIXON,
J. T. PANCOAST.

Copies of this patent may be obtained for five cents each, by addressing the "Commissioner of Patents, Washington, D. C."